United States Patent [19]
Hahner et al.

[11] 3,735,821
[45] May 29, 1973

[54] TRANSMISSION MEANS FOR USE IN TORQUE AND IMPULSE TRANSMITTING MACHINES

[75] Inventors: Reinhard Hahner, Stuttgart; Wolfgang Schmid, Plattenhardt, both of Germany

[73] Assignee: Robert Bosch GmbH, Stuttgart, Germany

[22] Filed: June 25, 1971

[21] Appl. No.: 156,735

[30] Foreign Application Priority Data

July 3, 1970 Germany.....................P 20 32 941.3

[52] U.S. Cl..................................................173/104
[51] Int. Cl. ............................................B25d 11/04
[58] Field of Search................................173/104, 117

[56] References Cited

UNITED STATES PATENTS 3,203,490  8/1965  McCarty et al........................173/117
3,430,709  3/1969  Miller...................................173/117

FOREIGN PATENTS OR APPLICATIONS 1,289,800  2/1969  Germany.............................173/104

Primary Examiner—James A. Leppink
Attorney—Michael S. Striker

[57] ABSTRACT

A portable torque and impulse transmitting machine wherein the output shaft of an electric motor carries two coaxial gears. One of the gears drives a first transmission which rotates the holder for a rotary tool, and the other gear transmits torque to a second transmission serving to oscillate an impeller which transmits impulses to the tool holder to thereby promote the penetration of the rotating tool into a wall or the like. One of the gears is integral with the output shaft and its modulus and the number of its teeth may, but need not differ from the modulus and the number of teeth of the other gear.

8 Claims, 1 Drawing Figure

PATENTED MAY 29 1973
3,735,821
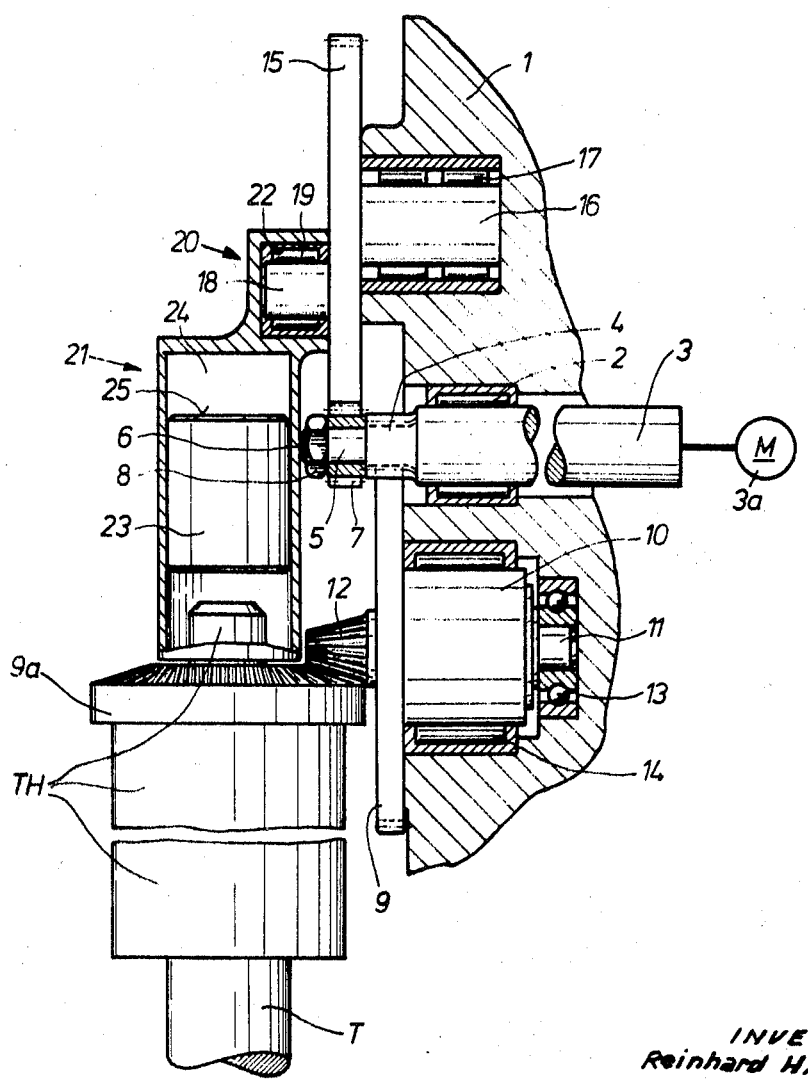
INVENTORS:
Reinhard HAHNER
Wolfgang SCHMID
By
MICHAEL S. STRIKER
their ATTORNEY

TRANSMISSION MEANS FOR USE IN TORQUE AND IMPULSE TRANSMITTING MACHINES

BACKGROUND OF THE INVENTION

The present invention relates to improvements in transmission means for use in torque and impulse transmitting machines, particularly to improvements in transmission means for use in portable power tools, such as hammer drills, impact wrenches or the like.

A portable power-operated torque and impulse transmitting machine has a rotary tool (e.g., a drill) which is rotated by an electric or pneumatic motor, and an impeller which is reciprocable in the housing of the machine to transmit to the tool holder a succession of impulses serving to drive the tool into a wall or the like while the tool rotates. Certain presently known hammer drills or analogous torque and impulse transmitting machines employ a gear or pinion which is provided on the output shaft of the motor to reciprocate the impeller by way of a first power train and to rotate the tool by way of a second power train. The two power trains have a common input member which is a gear meshing with the gear or pinion on the output shaft. A drawback of such machines is that a single tooth on the gear or pinion of the output shaft must stand all stresses, namely, the stresses which arise as a result of movements of the impeller as well as the stresses which develop as a result of transmission of torque to the tool. Also, the number of gears in such machines is very large and the two power trains occupy a large amount of space.

It is further known to place the pinion on the output shaft of the motor in a portable torque and impulse transmitting machine into mesh with two discrete gears one of which forms part of the power train for the impeller and the other of which transmits torque to the tool. An advantage of such machines is that the stresses which arise as a result of reciprocatory movements of the impeller are taken up by one tooth and the stresses which arise as a result of rotary movement of the tool are taken up by another tooth of the pinion on the output shaft. However, such machines still exhibit a serious drawback which is also shared by the first type of conventional machines, namely, that the high-frequency oscillatory movements of the impeller must be derived from the same pinion which serves to impart to the tool a relatively slow rotary movement. As a rule, the average torque which is required to oscillate the impeller exceeds at least three times the magnitude of torque which is needed to rotate the tool. Furthermore, a single tooth of the pinion on the output shaft of the motor must take up extremely high but short-lasting stresses which arise during each cycle of oscillatory movement of the impeller, namely, during maximum acceleration of the impeller. Therefore, the teeth of the pinion must be designed to stand substantial torque which must be transmitted to the transmission for the impeller and the stresses which arise due to the large step-down ratio of the drive for the rotary tool. As a rule, the design of teeth on the pinion is a compromise between the optimum design for moving the impeller and the optimum design for rotating the tool. Consequently, such machines must employ a transmission system which is neither best suited for transmission of motion to the impeller nor the most satisfactory solution for rotating the tool. A pinion which is best suited for moving the impeller must be provided with teeth which can stand very high bending stresses whereas the optimum step-down transmission for rotating the tool necessitates the provision of a pinion which exhibits other desirable characteristics.

SUMMARY OF THE INVENTION

An object of the invention is to provide a portable power-operated torque and impulse transmitting machine, such as a hammer drill, with novel and improved transmission means which is ideally suited for transmission of reciprocatory movements to the impeller and is also best suited for transmission of torque to the tool.

Another object of the invention is to provide a machine of the just outlined character with novel means for driving two discrete power trains, namely, a power train which reciprocates the impeller and a power train which rotates the tool.

A further object of the invention is to provide the prime mover of a motor in a portable torque and impulse transmitting machine with a novel output shaft.

An additional object of the invention is to provide the machine with novel means for transmitting motion from the output shaft of the motor to two discrete power trains.

The improved torque and impulse transmitting machine comprises a housing or body, an electric motor or another suitable prime mover mounted in the housing and having a rotary output shaft, an impact receiving tool holder which is rotatably mounted in the housing, a pair of coaxial gears provided on the shaft of the prime mover, first transmission means having a rotary input member meshing with one of the gears on the shaft and an output member arranged to rotate the tool holder, impeller means movable into and from impulse-transmitting engagement with the tool holder, and second transmission means having a rotary input member meshing with the other gear on the output shaft and output means arranged to move the impeller means in response to rotation of the output shaft.

The number of teeth on one of the gears may but need not be different from the number of teeth on the other gear, and the same applies for the moduli of the two gears. One of the gears may constitute a pinion which is integral with the output shaft of the prime mover, and the diameters of the input members of the two transmission means preferably exceed the diameters of the respective gears on the output shaft.

The novel features which are considered as characteristic of the invention are set forth in particular in the appended claims. The improved transmission means itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary central sectional view of a portable impulse and torque transmitting machine which embodies the improved transmission means.

DESCRIPTION OF THE PREFERRED EMBODIMENTS

The drawing illustrates a portable power-operated tool, for example, a hammer drill, which comprises a housing 1 having a handle, not shown, and surrounding a prime mover 3a (such as an electric or pneumatic motor). The output shaft 3 of the prime mover 3a is rotatable in a needle bearing 2 provided therefor in the housing 1. In accordance with a feature of the invention, the output shaft 3 can rotate two discrete gears, namely, a first gear 4 which preferably constitutes an integral pinion of the shaft 3 and a ring-shaped second gear 7 which is adjacent to the outer axial end of the gear 4. The output shaft 3 has a cylindrical portion 5 of reduced diameter which extends forwardly beyond the gear 4 and is surrounded by the ring-shaped gear 7 which is held thereon against rotation and against axial movement by an internally threaded member 8 (e.g., a nut) which meshes with the externally threaded portion or tip 6 of the shaft 3. The diameter of the cylindrical portion 5 is slightly smaller than the pitch circle of the gear 4 so that the front end face or shoulder 4a of the gear 4 serves as an abutment for the adjacent right-hand end face of the gear 7. The other end face of the gear 7 is in abutment with the right-hand end face of the nut 8. The right-hand end face of the nut 8, the end face 4a of the gear 4 and the two end faces of the gear 7 are located in planes which are normal to the axis of the shaft 3. The gear 7 has helical teeth and its right-hand end face is biased against the end face 4a of the pinion 4 by the nut 8.

The housing 1 further supports a rotary tool holder TH for a boring or drilling tool T. The tool holder TH is rotatable with reference to the housing 1 by a first transmission which receives torque from the gear 4 and includes a large-diameter gear 9 which constitutes the input member of the first transmission and forms the first element of a gear train having an output member 9a slidably mounted on the tool holder TH. The first transmission further includes a safety clutch 10 one element of which is driven by the gear 9 and another element of which drives a stub shaft 11 for a bevel gear 12. The latter meshes with a conical ring gear forming the output member 9a of the first transmission. The stub shaft 11 is rotatable in an antifriction ball bearing 13 which is mounted in the housing 1 and the clutch 10 is mounted in a needle bearing 14.

The illustrated machine further comprises a second transmission having a large-diameter input member or gear 15 which meshes with the gear 7 on the output shaft 3. The input member 15 is rigid with a stub shaft 16 which is mounted in two coaxial needle bearings 17 provided therefor in the housing 1. The input member 15 has an eccentric crank pin 18 which is surrounded by a needle bearing 19 and extends into a transversely extending guide slot 22 provided in a slide 20 which is reciprocable in parallelism with the axis of the tool holder TH. The slide 20 is rigidly connected to or integral with a cylinder 21 which constitutes the output member of the second transmission and serves to reciprocate an impeller 23 which can transmit impulses to the tool holder TH to thereby drive the tool T into a wall or the like while the tool rotates in response to rotation of the output member 9a of the first transmission. The guide slot 22 is normal to the direction of reciprocatory movement of the cylinder 21 and such direction is normal to the axes of the shafts 3, 11 and 16. The cylinder 21 is provided with a chamber 24 located behind the rear end face 25 of the impeller 23 and filled with a gas which is compressed during a first stage of forward (downward) movement of the cylinder 21 under the action of the crank pin 18 to thereupon accelerate the impeller in a direction toward the tool holder TH. The manner in which the impeller can transmit impacts to the tool holder TH and in which the tool holder can be rotated by the first transmission is preferably similar to that disclosed in the copending application Ser. No. 99,931 filed Dec. 21, 1970 by Karl Wanner et al., and assigned to the owner of the present application.

An important advantage of the illustrated machine is that the first and second transmissions which respectively serve to rotate the tool holder TH and to transmit to the tool holder a rapid succession of impulses receive torque from two discrete gears 4, 7 on the output shaft 3. The gear 4 can have a small modulus and a relatively small number of teeth which is best suited for the large step-down ratio of the first transmission which requires a small torque. The modulus and the number of teeth on the gear 7 may but need not be different from the corresponding characteristics of the gear 4; however, they are selected with a view to insure that the gear 7 is best suited to transmit torque to the second transmission which must transmit a higher torque. Since the gear 7 constitutes a discrete element, its modulus and the number of its teeth can be selected independently of the modulus and number of teeth on the gear 4. Another important advantage of the improved machine is that the wear is distributed between two discrete gears 4, 7 and that permanent bending stresses upon the output shaft 3 are also shared by two gears. This renders it possible to insure optimum conditions for long-lasting use of the machine and to provide on the shaft 3 two discrete gears which are best suited to drive the input members 9, 15 of the respective transmissions. It will be noted that the diameters of the input members 9, 15 substantially exceed the diameters of the respective gears 4, 7 on the output shaft 3. The prime mover 3a of the machine is preferably an electric motor.

The provision of the removable gear 7 in front of the gear 4 which is integral with the output shaft 3 facilitates the assembly and dismantling of the machine. The assembly is further facilitated if the cylindrical portion 5 of the output shaft 3 is shorter than the gear 7 and if the latter is rotatable and axially movable on the cylindrical portion 5 of the shaft 3 prior to tightening of the nut 8. Owing to such dimensioning of the shaft portion 5 and gear 7, the latter is held in strong frictional engagement with the end face 4a of the gear 4 when the nut 8 is driven home because the nut is caused to move into strong frictional engagement with the left-hand end face of the gear 7 by the gear 7 itself which by its helical teeth is biased against the nut 8. The shaft 3 and/or the shaft 16 is preferably rotatable in a single direction. If the shaft 3 is rotatable in a counterclockwise direction, seen on its end face, the gear 7 has teeth with right-hand helices, and vice versa. Also, if the shaft 3 is rotatable in a counterclockwise direction, seen on its end face, the threads of the nut 8 form right-hand helices, and vice versa.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a torque and impulse transmitting machine, particularly in a portable torque and impulse transmitting power tool, a combination comprising a housing; a prime mover mounted in said housing and having a rotary output shaft, said output shaft having in the region of one end a cylindrical portion of reduced diameter forming with the remainder of said shaft a shoulder at one of end of said cylindrical portion and an external threaded portion on the other end of said cylindrical portion; impulse-receiving tool holder means rotatably mounted in said housing; a pair of coaxial gears on said shaft, one of said gears being fixedly mounted on the remainder of said shaft and the other gear being a helical gear mounted with a slide fit on said cylindrical shaft portion and having a axial length slightly longer than that of said cylindrical portion; an internally threaded member screwed on to said externally threaded shaft portion so as to press said other gear against said shoulder, said output shaft being rotatable only in one direction and the teeth of said helical gear and the threads of said internally threaded member forming helices in a direction so as to tighten the pressure on the shoulder during turning of said output shaft in said one direction; first transmission means having a rotary input member meshing with said one gear and an output member arranged to rotate said rotary tool holder means; impeller means movable into and from impulse transmitting engagement with said tool holder means; and second transmission means having a rotary input member meshing with said other gear and output means arranged to move said impeller means in response to rotation of said last mentioned input member.

2. The combination of claim 1, wherein the number of teeth on one of said gears differs from the number of teeth on the other gear.

3. The combination of claim 1, wherein the modulus of one of said gears differs from the modulus of the other gear.

4. The combination of claim 1, wherein one gear is integral with said shaft.

5. The combination of claim 4, wherein the diameters of said input members exceed the diameters of the respective gears on said shaft.

6. A combination as defined in claim 1, said externally threaded portion of said output shaft being coaxial with said cylindrical portion and having a diameter which at most equals the internal diameter of said other gear.

7. A combination as defined in claim 1, wherein said output shaft is rotatable in a counterclockwise direction, seen on its end face, the teeth of said other gear and the threads of said internally threaded member forming right-hand helices.

8. A combination as defined in claim 1, wherein said output shaft is rotatable in a clockwise direction, seen on its end face, the teeth of said last mentioned gear and the threads of said internally threaded member forming left-hand helices.

* * * * *